(12) United States Patent
Metzler et al.

(10) Patent No.: US 9,758,239 B2
(45) Date of Patent: Sep. 12, 2017

(54) SYSTEM AND METHOD FOR CONTROLLING AN UNMANNED AIR VEHICLE

(75) Inventors: Bernhard Metzler, Dornbirn (AT); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/111,162

(22) PCT Filed: Apr. 13, 2012

(86) PCT No.: PCT/EP2012/056760
§ 371 (c)(1),
(2), (4) Date: Oct. 10, 2013

(87) PCT Pub. No.: WO2012/140191
PCT Pub. Date: Oct. 18, 2012

(65) Prior Publication Data
US 2014/0032021 A1    Jan. 30, 2014

(30) Foreign Application Priority Data

Apr. 14, 2011  (EP) ...................... 1162507

(51) Int. Cl.
*B64C 19/00* (2006.01)
*B64C 13/20* (2006.01)
(Continued)

(52) U.S. Cl.
CPC .............. *B64C 19/00* (2013.01); *B64C 13/20* (2013.01); *B64C 39/024* (2013.01);
(Continued)

(58) Field of Classification Search
CPC ............ B64C 39/024; B64C 2201/141; B64C 2201/146; G05D 1/101
See application file for complete search history.

(56) References Cited

U.S. PATENT DOCUMENTS 5,372,334 A    12/1994  Cuadros
6,955,324 B2 * 10/2005  Tanielian .................... 244/3.13
(Continued)

FOREIGN PATENT DOCUMENTS

CN    101975569 A    2/2011
CN    101976078 A    2/2011
(Continued)

OTHER PUBLICATIONS

European Search Report dated Sep. 1, 2011 in application No. 11 16 2507.

*Primary Examiner* — Rami Khatib
*Assistant Examiner* — Nicholas K Wiltey
(74) *Attorney, Agent, or Firm* — Maschoff Brennan (57) ABSTRACT

A geodetic measuring system having a geodetic measuring unit having a beam source for emitting a substantially collimated optical beam. The measuring system also has an automotive, unmanned, controllable air vehicle having an optical module. An evaluation unit is also provided, wherein the evaluation unit is configured in such a manner that an actual state of the air vehicle, as determined by a position, an orientation and/or a change in position, can be determined in a coordinate system from interaction between the optical beam and the optical module. The measuring system has a control unit for controlling the air vehicle, wherein the control unit is configured in such a manner that control data can be produced using an algorithm on the basis of the actual state, which can be continuously determined in particular, and a defined desired state, and the air vehicle can be automatically changed to the desired state.

35 Claims, 5 Drawing Sheets

(51) Int. Cl.
  *B64C 39/02* (2006.01)
  *G05D 1/00* (2006.01)
  *G01S 5/00* (2006.01)
  *G01S 5/16* (2006.01)
  *G01S 17/66* (2006.01)
  *G01C 15/00* (2006.01)

(52) U.S. Cl.
  CPC .............. *G01S 5/0036* (2013.01); *G01S 5/16* (2013.01); *G01S 17/66* (2013.01); *G05D 1/0033* (2013.01); *B64C 2201/146* (2013.01); *G01C 15/002* (2013.01)

(56) References Cited

U.S. PATENT DOCUMENTS

| | | | | |
|---|---|---|---|---|
| 7,602,480 | B2 * | 10/2009 | Romain et al. | 356/139.01 |
| 2004/0021852 | A1 * | 2/2004 | DeFlumere | 356/141.1 |
| 2004/0141170 | A1 * | 7/2004 | Jamieson | G01S 7/4811 |
| | | | | 356/5.01 |
| 2008/0195304 | A1 * | 8/2008 | Krishnaswamy | 701/200 |
| 2010/0084513 | A1 * | 4/2010 | Gariepy et al. | 244/190 |
| 2011/0307126 | A1 * | 12/2011 | Hogstrom | G05D 1/0684 |
| | | | | 701/16 |
| 2015/0148988 | A1 * | 5/2015 | Fleck | G05D 1/0011 |
| | | | | 701/2 |
| 2016/0349746 | A1 * | 12/2016 | Grau | G05D 1/0011 |

FOREIGN PATENT DOCUMENTS

| | | |
|---|---|---|
| DE | 31 07 674 A1 | 9/1982 |
| EP | 1 898 181 A1 | 3/2008 |
| EP | 1926007 A2 | 5/2008 |
| EP | 2 177 966 A2 | 4/2010 |
| JP | 2000-159194 A | 6/2000 |
| JP | 2003-104295 A | 4/2003 |

\* cited by examiner

SYSTEM AND METHOD FOR CONTROLLING AN UNMANNED AIR VEHICLE

FIELD OF THE INVENTION

The invention relates to a measuring system for controlling a self-propelled, unmanned, controllable aerial vehicle using a measuring unit according to the preamble of claim 1 and a method for controlling the aerial vehicle, according to claim 8.

BACKGROUND

These days, unmanned aerial vehicles are used in many fields of technology as a result of flexible employability, be it to reach terrain sections that are difficult to access, for example when fighting fires or in disaster zones, or to carry out an image-supported examination of large objects. In order to capture terrain information, such instruments can be equipped with sensors, e.g. with cameras, and relatively large terrain sections can be recorded contiguously therewith from the air. Furthermore, corresponding drones can be employed for military purposes, e.g. for monitoring, target acquisition, as combat unit or transport means.

In principle, an unmanned aerial vehicle can be controlled or moved manually by means of a remote control by a user or in a completely autonomous or semiautonomous fashion, usually on the basis of GNSS position information.

In general, it is possible to modify four from six degrees of freedom when moving the aerial vehicle, e.g. a helicopter-like aerial vehicle, i.e. the aerial vehicle can be moved forward and backward, left and right and up and down. Moreover, the alignment of the aerial vehicle can be modified by a rotation about the vertical axis. The remaining two degrees of freedom are fixed by the substantially horizontal position of the aerial vehicle.

Precise positioning in a predetermined position or precise movement, e.g. along a predefined axis or flight route, was found to be difficult for a user in the case of manual control. Particularly if the aerial vehicle is exposed to external influences, such as e.g. wind, and the deviations created thereby have to be compensated for with quick reactions, a required accuracy can often not be maintained in the case of such a manual control.

Furthermore, the field of application for an autonomous GNSS-based control is limited to locations at which a sufficient number of satellite signals can be received for determining the position. Hence, in general, a use in e.g. closed rooms or tunnels is not possible. The use in heavily built-up areas can also be difficult if buildings shield GNSS signals.

In order to control an aerial vehicle in such a built-up area, EP 1 926 007 proposes a first flyby over the relevant area, during which images are taken and GPS information is stored with each image. The images are subsequently combined to form an overview image with GPS position information. In order to navigate the aerial vehicle, the images which are recorded at a lower altitude than the ones recorded in advance can now be compared to the overview image and a respective position of the aerial vehicle can be derived on the basis of the stored GPS information. Disadvantages in this procedure can emerge if the first overview image does not comprise all areas of the buildings and the spaces between the buildings and it proves impossible to find correspondence in the case of an image comparison. Positional determination can also be impaired by changes in the surroundings captured at first, for example by movement of vehicles depicted in the image or if light conditions change. Furthermore, this method is limited by the resolution of the camera capturing the surroundings.

EP 1 898 181 discloses a further system and method for controlling an unmanned aerial vehicle, wherein GPS signals, measurement data from inertia sensors and images captured by a camera are used for determining or estimating a position of the aerial vehicle. The captured signals and data can be fed to a computer unit and the position can be determined therefrom. By using the camera, carrying out this determination of the position can supply more reliable results compared to systems without a camera and enable an increased accuracy. However, this method is also limited by the resolution of the camera or can possibly only be carried out to restricted extent as a result of changes in the captured surroundings.

In the case of an autonomous control, the route can furthermore be prescribed to the aerial vehicle in the form of a trajectory, for example it can be defined by several waypoint positions. EP 2 177 966 describes a navigation method for a aerial vehicle on the basis of a predetermined flight route, wherein, for the purposes of controlling the aerial vehicle, pictures of the flight surroundings can be taken by a camera and the flight route can be adapted on the basis thereof. In order to control the aerial vehicle on the flight route, specific intended positions or waypoint positions can be compared to a current actual position of the aerial vehicle, which can, for example, be determined by the GNSS signals. Control signals for the movement of the aerial vehicle can thus be determined from the differences in position and, as a result thereof, a deviation of the actual position with respect to the target position can successively be reduced.

What is common to the aforementioned methods or systems is that the position of the aerial vehicle, in particular the vertical position, can only be determined to an accuracy of up to 2-5 cm by means of GNSS sensors. This uncertainty subsequently has a great limitation on the accuracy when determining the position of the aerial vehicle and on the accuracy when controlling the aerial vehicle.

SUMMARY

Accordingly, an object of the present invention is to provide an improved, more robust system or method for controlling an unmanned aerial vehicle, by means of which the aerial vehicle can be positioned and moved in a more user-friendly and precise manner and with a higher degree of automation. A special object of the invention is to make in possible to carry out this positioning and movement of the aerial vehicle independent of being able to receive GNSS signals.

These objects are achieved by the realization of the characterizing features of the independent claims. Features which develop the invention in an alternative or advantageous fashion can be gathered from the dependent patent claims.

The system for controlling the unmanned aerial vehicle (UAV) has e.g. a theodolite, a total station, a laser tracker, a laser scanner or a rotational laser and a control unit. By means of control signals, the control unit can bring about a positioning or movement of the aerial vehicle, by virtue of e.g. a rotational speed of the rotors, of which, in particular, there are four, of the aerial vehicle or a respective alignment of the rotors being able to be set in a defined fashion. Here, the respective measuring instrument is in contact with the aerial vehicle, for example by a laser beam emitted by the measuring instrument and/or by radio signals. By means of the laser beam and a reflector attached to the aerial vehicle, a distance between the aerial vehicle and the measuring instrument can be determined by reflection of the beam and reception at the measuring instrument. Furthermore, a vertical and horizontal angle of the emitted beam, i.e. an emission direction, can be captured by angle measurement units on the measuring instrument and this can be used in conjunction with the determined distance to determine, precisely in geodetic terms, a position of the aerial vehicle with respect to the measuring instrument in a relative coordinate system.

Furthermore, the laser beam, e.g. in a combined aerial vehicle/rotational laser, can be received on the part of the aerial vehicle by a laser beam reception unit. By means of this unit, it is possible to determine an angle of incidence of the laser beam relative to the reception unit and, from this, a relative alignment of the aerial vehicle with respect to the laser beam (actual state of the aerial vehicle) can be derived by an evaluation unit. Moreover, it is possible to determine an offset of the beam from a defined zero position of the reception unit and, from this, a relative position of the aerial vehicle with respect to the laser beam can in turn be derived. Correction parameters can be established from the respective offset and/or the angle of incidence, which correction parameters serve to control the aerial vehicle in such a way that an intended position and intended alignment are reached, wherein, when the intended state is reached, the offset or the relative angle of incidence respectively assume the zero position, i.e. have no deviation from an intended value.

Using such a reception unit, the aerial vehicle can moreover be coupled to a laser beam. By way of example, this beam can be emitted by a laser scanner and the aerial vehicle can be controlled by a user with a remote control in such a way that the laser beam impinges on the reception unit. As soon as the beam is received, a computer unit in the aerial vehicle can then at least partly assume the control. In a control group, the current position, the orientation, the velocity and flight direction of the aerial vehicle can be established continuously and thereby be compensated for or corrected such that the laser beam impinges centrally, i.e. without deviating from the zero position, on the reception unit. Using the remote control, the user can now move the aerial vehicle along the laser beam, i.e. with one remaining degree of freedom. In this configuration, the aerial vehicle can now be guided, additionally or alternatively, by realignment or by pivoting of the emitted beam. If e.g. a rotational laser is employed in place of the laser scanner, it can be used to span a laser plane and the aerial vehicle can be "put" onto this plane. Here, the user is also able to move the aerial vehicle—now with two degrees of freedom—in the plane or parallel thereto. By way of example, the plane or beam can be aligned horizontally and thereby bring about a horizontal movement of the aerial vehicle. Moreover, these can be aligned at any angle or vertically, in particular wherein, in the case of a vertical alignment, the altitude of the aerial vehicle above the ground can remain freely selectable. By way of example, such an application can be useful in the case of work along a building façade or for measuring the latter.

Depending on the embodiment of the laser beam reception unit, the angle of incidence range to be detected can be restricted to a range between e.g. 0° and 180°, in particular between 0° and 45°. As a result of this, the arrangement of the reception unit on the aerial vehicle must be adapted to the respective alignment of the laser beam or the laser plane in order to ensure continuous reception of the beam. In the case of a horizontal beam alignment, the laser beam reception unit can, for example, be attached laterally to the UAV; in the case of a vertical alignment, it can, for example, be arranged on the underside of the UAV. For universal use of the aerial vehicle, the laser beam reception unit can furthermore be attached to the aerial vehicle in such a pivotable manner that the reception unit can, depending on the alignment of the laser beam, be pivoted in a particular angular position and thereby receive the beam within the detection region, which is predetermined by the design. In order to determine the beam offset, it is also possible, depending on the beam alignment, to adapt the arrangement of the reception unit or align a main detection direction of the reception unit in a pivoting fashion with respect to the beam.

In principle, an actual state of the aerial vehicle in the relative coordinate system, i.e. a state which, for example, at least in part describes a current position, a current alignment, a velocity or a flight direction of the aerial vehicle, can be determined continuously for controlling the UAV by an interaction with the measuring unit. Moreover, an intended state for the aerial vehicle can be predetermined with information content in the measuring system, which information content, in composition and form, corresponds to the actual state. On the basis of the actual state determined thus and on the basis of the defined intended state to be reached by the aerial vehicle, correction values can be established by comparing the state, by means of which correction values the targeted control of the aerial vehicle to the intended state can be realized. It is therefore possible to derive control data from the corrections and provide said control data to the aerial vehicle, for example for actuating the rotors. The correction or control data can be established by the control unit, wherein the control unit can in this case be associated with the measuring unit, the aerial vehicle or the remote control or can furthermore be designed as a structurally independent unit.

It is furthermore possible to prescribe an individual point, a trajectory, an axis and/or a plane to the system as intended state or intended position and the aerial vehicle can be positioned and moved in accordance with the respective prescription, in particular by a continuous comparison of intended and actual values and iterative repositioning. A trajectory or a flight route can, for example, be set by a start point and an end point, wherein the aerial vehicle can in this case be guided along a straight connecting line from the start point to the end point in a manual, autonomous or semiautonomous fashion, i.e. the aerial vehicle moves substantially independently, but a user can intervene in the movement procedure and for example temporarily interrupt the latter. Further waypoints can be defined between the start point and end point and the flight route can be adapted, in particular automatically, in such a way that the waypoints lie on the route. Furthermore, the flight route to be flown can be defined independently of start, end and waypoints, by the position of a movement axis. In the case of a defined flight route, a comparison of the route profile with the current actual state of the aerial vehicle can be undertaken for controlling the aerial vehicle and said comparison can be used to establish the respective correction values or control data. Here, in order to optimize the flight movement of the aerial vehicle in the case of a necessary positional correction toward the flight route, there can be an optimized correction movement, e.g. taking into account the current flight direction and velocity of the aerial vehicle, instead of a direct movement, i.e. instead of a movement along the shortest connection between actual position and flight route.

In addition to measurements of the measuring instrument and/or the laser beam reception unit, measurements from a sensor unit arranged on the aerial vehicle can also be used for determining the alignment of the aerial vehicle and/or the velocity in the relative coordinate system in order to determine corrections. To this end, the sensor unit can detect inertia values, e.g. by means of an accelerometer, and a geographic alignment, e.g. by a magnetometer. The corrections can likewise be converted into control signals for the aerial vehicle and thereby bring about a change in the position, the alignment, the velocity and/or the flight direction.

Furthermore, in order to determine the alignment of the aerial vehicle, markings, e.g. defined patterns, pseudo-random patterns or luminous means, can be applied to the aerial vehicle at a specific position and arrangement and an external detection unit can detect these markings. The detection unit, in particular a camera, can, to this end, be arranged on the measuring instrument or be designed as an independent unit. The position of at least some of the markings in an image captured by the camera can then allow deductions to be made in respect of the alignment of the aerial vehicle in the relative coordinate system. Furthermore, the aerial vehicle can be captured by a RIM camera (range imaging camera) and, as a result thereof, it is possible to capture an image with point-resolved distance values from the RIM camera to the aerial vehicle. Hence, the distance and, if the shape of the aerial vehicle is known, the alignment of the aerial vehicle can be likewise be derived from this data.

Moreover, further applications can be made possible with distance measuring sensors arranged on the aerial vehicle. Here, the aerial vehicle can, for example, be controlled in such a way that a distance to an object can be kept constant, e.g. at 40 cm, in particular in order to avoid collisions or to maintain an optimum measurement distance for an additional data detection sensor (e.g. scanner or camera). By way of example, it is hence possible to carry out a reliable control of the aerial vehicle in surroundings with a restricted amount of available space, by virtue of it being possible to detect possible obstacles by the distance sensors and fly around these or to be able to measure spatial restrictions continuously, for example in the case of a flight through a pipe, a pipeline or a tunnel, and adapt the position of the aerial vehicle accordingly. In the case of such a spatially restricted movement, the aerial vehicle can, in particular, be coupled to a laser beam and be guided on the basis of this beam. Using such a combination of distance measurement and guidance on the basis of a beam, it is furthermore possible, for example in a case of a horizontal alignment of the guide beam, movement of the aerial vehicle along this beam and a continuous distance measurement from the flown-over terrain, to generate a terrain profile or a terrain section by linking respective distance measurements and respective aerial vehicle positions.

In particular, it is possible for the position of the measuring unit, i.e. the setup point thereof, to be predetermined by a known point and an alignment to be determined by measuring a known target point or by means of an inclination sensor and a magnetometer. Moreover, the position and alignment can be determined by sighting at least three target points, in particular if the setup point is unknown. As a result of this procedure, it is possible to determine the position and the coordinates of the measuring unit and the orientation of the measuring unit in a global coordinate system, which is superordinate to the relative coordinate system. Furthermore, the direction of the movement axis can be given in the global coordinate system. With this knowledge, it is now possible to reference the relative coordinate system to the global coordinate system, e.g. by a coordinate transform. As a result of this, it is possible to transfer the position and alignment of the UAV, determined in the relative coordinate system, into the global coordinate system and, for example, it is possible to specify an absolute position and alignment of the UAV in this superordinate coordinate system.

The invention relates to a geodetic measuring system with a geodetic measuring unit, in particular a total station, theodolite, laser tracker or laser scanner, with a beam source for emitting a substantially collimated optical beam, a base, a sighting unit which can be pivoted by motor about two axes relative to the base for aligning an emission direction of the optical beam and angle measurement sensors for determining the alignment of the sighting unit, and, in particular, with a ranging functionality. Moreover, the measuring system comprises a self-propelled, unmanned, controllable aerial vehicle with an optical module, wherein the aerial vehicle is designed in such a way that the aerial vehicle can be moved in a controlled fashion and positioned at a substantially fixed position. Moreover, provision is made for an evaluation unit, wherein the evaluation unit is configured in such a way that it is possible to determine an actual state of the aerial vehicle in a coordinate system, determined by a position, an alignment and/or a change in position, from an interaction of the optical beam with the optical module. The measuring system comprises a control unit for controlling the aerial vehicle, wherein the control unit is configured in such a way that, on the basis of an algorithm depending on the actual state, which can in particular be determined continuously, and a defined intended state, control data can be produced and the aerial vehicle can be brought into the intended state, in particular into a defined tolerance range about the intended state, in an automatically controlled fashion by means of the control data.

The sighting unit of the geodetic measuring unit can, in one embodiment, be designed as an emission unit (with telescopic unit) having the beam source. In particular, such an embodiment can be realized for designing a total station or a theodolite.

In respect of the design of laser trackers or laser scanners, the beam source can be provided in e.g. a support, which is designed such that it can pivot relative to the base about a standing axis defined by the base, or in the base, wherein the emitted radiation can be guided to the sighting unit by means of optical beam guiding elements. In this context, the sighting unit can be designed as e.g. beam deflection element (e.g. mirror).

In the geodetic measuring system according to the invention, it is possible to take account of an actual position, an actual alignment and/or an actual velocity of the aerial vehicle when determining the actual state and/or it is possible to take account of an intended position, an intended alignment and/or an intended velocity when defining the intended state.

A state of the aerial vehicle, e.g. the position, the alignment, the flight velocity or flight alignment, can be determined continuously in such a system. To this end, the measuring unit can emit a laser beam, which can interact with a sensor or reflector on the aerial vehicle. The state of the aerial vehicle can then be established on the basis of this interaction. Moreover, it is possible to define an intended state for the aerial vehicle, for example a position at which the UAV should be positioned, and there can be such a control of the aerial vehicle on the basis of a comparison between the established actual state of the aerial vehicle with this intended state that the aerial vehicle is moved or aligned to the intended state and assumes the intended state, i.e. that, for example, the actual position corresponds to the intended position. For this regulation process, control data for controlling the aerial vehicle are produced on the basis of an algorithm. Here, the produced measurement data or the actual position and actual alignment of the aerial vehicle can be supplied to e.g. a Kalman filter and the control data can be generated from the sum of the data, taking into account a defined intended state. Moreover, in order to establish the control data, averages can be derived from the measurement variables. Furthermore, a difference can be formed continuously between individual intended/actual variable pairs and a direction and distance to the intended position can be determined e.g. on the basis of a difference in position determined thus and the control data in relation to flight direction, flight path and flight velocity can be derived. As a result, the rotors of the aerial vehicle can, for example, be actuated in such a way that, particularly as a result of different rotational speeds, there is a controlled movement of the aerial vehicle to the intended position. Moreover, there can be continuous reevaluation and calculation of the control data within the scope of the algorithm from a continuous comparison between the actual position and the intended position, as a result of which the position of the aerial vehicle can continuously be readjusted by means of such a control loop.

In particular, it is possible for the optical module of the geodetic measuring system according to the invention to be embodied by a reflector which specifies the actual position of the aerial vehicle and for the beam to be able to be reflected by means of the reflector, wherein a distance from the measuring unit to the aerial vehicle can be determined and the actual position of the aerial vehicle can be derived, in particular continuously, from the distance and the emission direction of the beam.

By virtue of the reflector on the aerial vehicle being sighted by e.g. a laser beam, the actual state, in particular the actual position, of the aerial vehicle can be established by the measuring unit, e.g. by a total station. To this end, the reflected beam for the distance measurement, detected at the measuring instrument, and the detected angles at which the beam is emitted are used to determine the direction and a position and alignment of the aerial vehicle relative to the position of the measuring unit can be derived therefrom.

Furthermore, the optical module of a geodetic measuring system according the invention can be embodied by a beam detection unit and the optical beam can be received by the beam detection unit, wherein a beam offset from a zero position and/or an angle of incidence of the beam can be determined, in particular continuously, by means of the beam detection unit for at least partly determining the actual state, and the control unit is configured in such a way that the aerial vehicle can be positioned and aligned, depending on the beam offset and/or the angle of incidence of the beam. Moreover, the aerial vehicle, in particular, can be coupled to the beam by the beam detection unit and can be guided along the beam and/or by a change in the emission direction of the beam.

Within the scope of the invention, a guide plane, in particular a laser plane, in particular in the horizontal, can be defined by a rotation of the beam and the aerial vehicle can be positioned and/or guided by means of the beam detection unit in a defined fashion relative to the guide plane, in particular in the guide plane or parallel to the guide plane.

As an alternative to reflecting the beam at the UAV, the former can be received at the corresponding detection unit and a state of the aerial vehicle relative to the measuring unit can be determined from a determinable angle of incidence of the beam and/or a possible deviation from a zero position of the impact point on a detector in the detection unit. On the basis of the variables which can be established thereby, the aerial vehicle can in turn be controlled—by an actual/intended comparison—and the aerial vehicle can be brought into the intended state. Using such an arrangement, the UAV can moreover be coupled to the beam. To this end it is possible, likewise depending on the determined deviations of the beam incident in the beam detection unit, to control the UAV in such a way that the deviations are continuously compensated for and the beam remains aligned to the beam detection unit or the UAV. In particular, the UAV can then moreover be controlled by virtue of modifying the alignment of the beam, wherein the aerial vehicle moves in correspondence with the alignment change. The degrees of freedom in which the aerial vehicle can be moved in the case of coupling can be defined by means of the beam configuration, i.e., for example, an aligned beam or a plane defined by rotation of the beam. Hence the aerial vehicle can also be coupled to a spanned plane and be moved in the latter, wherein, in this case, there is not a continuous contact between beam and detection unit, but rather said contact is ongoing, interrupted depending on a rotational frequency of the beam.

According to the invention, the geodetic measuring system can be embodied in such a way that the beam detection unit can be pivoted on the aerial vehicle in such a defined fashion that the beam can be received. By way of example, in the case of an oblique alignment of the beam, this can make it possible to establish contact between beam and beam detection unit and thereby open up universal employability for the system or a broad spectrum of application for the aerial vehicle control.

Moreover, according to the invention, the aerial vehicle can have a sensor unit for determining the actual alignment and/or the actual velocity of the aerial vehicle in the coordinate system, in particular an inclination sensor, a magnetometer, an accelerometer, a rate sensor and/or a velocity sensor, in particular a GNSS module. Moreover, the aerial vehicle can have a marking specifying the actual alignment, in particular a defined pattern, pseudo-random pattern, a barcode and/or a light-emitting diode, and the measuring system can have a detection unit, in particular a camera, for detecting the marking and for determining the actual alignment of the aerial vehicle in the coordinate system from the position and arrangement of the marking. Moreover, the measuring system can have a distance image detection unit, in particular a RIM camera, for taking an image of the aerial vehicle, wherein a contour and/or pixel-dependent distance data in respect of the aerial vehicle can be derived from the image and the actual alignment and/or the distance to the aerial vehicle in the coordinate system can be determined therefrom.

The alignment and/or the flight velocity, in particular the position, of the aerial vehicle can be determined by means of one of the above-described arrangements and hence it is possible to establish the actual state of the aerial vehicle. Moreover, a GNSS module can be arranged on the aerial vehicle in a supportive manner and the actual position, a flight direction and hence the actual alignment of the aerial vehicle can be determined from, in particular continuously, received GNSS signals. Hence, if the position of the measuring unit is known, it is possible, for example, to determine the distance thereof to the aerial vehicle and take this information into account when establishing the actual state and the control data. Moreover, the measuring unit can be equipped with a GNSS module (for receiving GNSS signals) and it can be used to establish the position of the unit or a positional relation to the aerial vehicle.

In particular, the control unit can, according to the invention, be configured in such a way that the aerial vehicle can be moved depending on the actual state and a specific flight route, wherein the flight route can be determined by a start point and an end point and/or by a number of waypoints, in particular automatically, and/or by a defined position of a flight axis, in particular wherein a movement of the aerial vehicle can be optimized taking into account the actual state, and in particular wherein information relating to the actual state, in particular the actual position, the actual alignment, the actual velocity, the angle of incidence, the beam offset and/or the distance to the measuring unit, can be fed to a Kalman filter and the movement of the aerial vehicle can be controlled taking into account parameters calculated by the Kalman filter. The flight route can furthermore be defined taking into account the surroundings of the aerial vehicle and can, in the process, take into account e.g. obstacles or directional changes in narrow surroundings. By way of example, the route can be adapted in a pipe in such a way that it is ensured that collisions with the pipe wall are avoided. Moreover, it is possible for e.g. the flight route to be defined depending on a terrain model, in particular a CAD model.

Furthermore, the aerial vehicle of a geodetic measuring system according to the invention can have a sensor for measuring, in particular continuously, an object distance to an object, wherein the object distance can be taken into account when controlling the aerial vehicle and/or wherein the respective object distance can be linked with the respective actual state, in particular the actual position, in the case of a guide, in particular a linear horizontal guide, of the aerial vehicle in such a way that an object surface profile, in particular a terrain section, can be determined. Using such an embodiment, the aerial vehicle can, taking into account the sensor measurements, be controlled in such a way that obstacles are once again identified and it is possible to avoid a collision with the latter. Moreover, the sensors can detect or measure objects along which the aerial vehicle is guided.

Moreover, the aerial vehicle can be controlled in such a way that the aerial vehicle can be guided constantly at a specific intended distance from the object depending on the measurement of the object distance. By maintaining a predetermined distance from an object, a possible collision with an obstacle can therefore be avoided. Moreover, the UAV can be coupled to a laser plane and thus be moved in the horizontal, e.g. in the case of a horizontal alignment of the plane defined by a rotating laser beam, wherein a constant distance to e.g. a tunnel wall can be maintained.

Furthermore, within the scope of the geodetic measuring system, a position and alignment of the measuring unit can be predetermined in a global coordinate system, wherein the position can be predetermined by a known setup point of the measuring unit and/or the position and alignment can be determined by calibration on the basis of known target points, in particular wherein the coordinate system can be referenced with the global coordinate system such that the actual state of the aerial vehicle can be determined in the global coordinate system. As a result, the aerial vehicle can be controlled in relation to the superordinate, global coordinate system and the actual state can likewise be determined in respect of this system.

In a geodetic measuring system according to the invention, state information, in particular actual state information, intended state information and/or the distance between the measuring unit and the aerial vehicle, can be transmitted between the measuring unit and the aerial vehicle for producing control data and/or the control data, in particular wherein the state information can be transmitted by radio link, in a wired fashion and/or modulated onto the beam. Furthermore, the measuring system can have a remote control unit for controlling the aerial vehicle, wherein the state information and/or the control data can be transmitted between the remote control unit and the measuring unit and/or the aerial vehicle, in particular by means of radio link or via a cable. Hence measurement data can be interchanged between the system components, collected on a component and the control data can be produced on this component. By way of example, in the case of coupling of the aerial vehicle to the laser beam, the information, e.g. the distance or the actual state, can be transmitted on the basis of a signal that is modulated onto the laser beam. As a result, there can be direct interchange of the measurement data and, for example, the control of the aerial vehicle by a control unit in the aerial vehicle can occur on the basis of a comparison of the respectively provided actual state with the intended state.

The invention furthermore relates to a method for controlling a self-propelled, unmanned, controllable aerial vehicle, wherein the aerial vehicle is moved in a controlled fashion and/or positioned at a substantially fixed position, with a geodetic measuring unit, in particular a total station, theodolite, laser tracker or laser scanner, with a beam source for emitting a substantially collimated optical beam, a base, a sighting unit which can be pivoted by motor about two axes relative to the base for aligning an emission direction of the optical beam and angle measurement sensors for determining the alignment of the sighting unit, and, in particular, with a ranging functionality. The measuring unit is used to bring about an emission of a substantially collimated optical beam in an emission direction. The optical beam interacts with the aerial vehicle in such a way that the former is reflected or received at the aerial vehicle, wherein an actual state of the aerial vehicle in a coordinate system is determined from the interaction, which actual state is determined by a position, an alignment and/or a change in position. Furthermore, control data are produced depending on the actual state, which is in particular determined continuously, and a defined intended state and the aerial vehicle is brought into the intended state, in particular in a defined tolerance range about the intended state, in an automatically controlled fashion by means of the control data.

Within the scope of the method, an actual position, an actual alignment and/or an actual velocity of the aerial vehicle can be taken into account when determining the actual state and/or an intended position, an intended alignment and/or an intended velocity can be taken into account when defining the intended state.

Furthermore, according to the invention, a distance from the measuring unit to the aerial vehicle can be determined by means of reflecting the beam at the aerial vehicle and the actual position of the aerial vehicle can be derived, in particular continuously, from the distance and the emission direction.

In the method according to the invention, a beam offset can be determined, in particular continuously, from a zero position and/or an angle of incidence of the beam when receiving the beam at the aerial vehicle for determining the actual state and the aerial vehicle can be positioned and aligned, depending on the beam offset and/or the angle of incidence of the beam, in particular wherein the aerial vehicle can be coupled to the beam and guided along the beam and/or by a change in the emission direction of the beam.

Moreover, within the scope of the method according to the invention, a guide plane, in particular a laser plane, in particular in the horizontal, can be defined by rotating the beam and the aerial vehicle can be positioned and/or guided in a defined fashion relative to the guide plane, in particular in the guide plane or parallel to the guide plane.

Moreover, according to the invention, the actual alignment of the aerial vehicle can be determined in the coordinate system in the pitch, roll and yaw directions, in particular wherein determination takes place by means of an internal sensor unit associated with the aerial vehicle, in particular by means of an inclination sensor, magnetometer, accelerometer, rate sensor and/or velocity sensor. Moreover, the actual alignment in the coordinate system can be determined by means of an interaction of a marking, which is associated with the aerial vehicle and specifies the actual alignment, in particular of a defined pattern, of a pseudo-random pattern, of a barcode and/or of a light-emitting diode and a detection, in particular by means of a camera, of the marking for determining the actual alignment from a position and arrangement of the marking. Furthermore, the actual alignment can be determined in the coordinate system by taking an image of the aerial vehicle, wherein a contour and/or pixel-dependent distance data in respect of the aerial vehicle are derived from the image.

Within the scope of the method according to the invention, the aerial vehicle can be moved dependent on the actual state and a specific flight route, wherein the flight route can be determined, in particular automatically, by a start point and an end point and/or by a number of waypoints and/or by a defined position of a flight axis, in particular wherein a movement of the aerial vehicle can be optimized taking into account the actual state. Alternatively, or in addition thereto, information in respect of the actual state, in particular the actual position, the actual alignment, the actual velocity, the angle of incidence, the beam offset and/or the distance to the measuring unit, can be fed to a Kalman filter and the movement of the aerial vehicle can be controlled taking into account parameters calculated by the Kalman filter.

Furthermore, according to the invention, an object distance from the aerial vehicle to an object can be measured, in particular continuously, wherein the object distance can be taken into account when controlling the aerial vehicle and/or wherein the aerial vehicle (20) can be controlled in such a way that the aerial vehicle (20) is guided constantly at a specific intended distance from the object (81, 85) depending on the measurement of the object distance.

Furthermore, in the method according to the invention, a position and alignment of the measuring unit can be predetermined in a global coordinate system, wherein the position can be predetermined by a known setup point of the measuring unit and/or the position and alignment can be determined by calibration on the basis of known target points, in particular wherein the coordinate system can be referenced with the global coordinate system such that the actual state of the aerial vehicle can be determined in the global coordinate system.

The invention furthermore relates to a geodetic measuring unit, in particular a total station, theodolite, laser tracker or laser scanner, for a system according to the invention, with a beam source for emitting a substantially collimated optical beam, a base, a sighting unit which can be pivoted by motor about two axes relative to the base for aligning an emission direction of the optical beam and angle measurement sensors for determining the alignment of the sighting unit, and, in particular, with a ranging functionality. Furthermore, the measuring unit is embodied in such a way that control data for controlling a self-propelled, unmanned, controllable aerial vehicle can be generated and transmitted to the aerial vehicle.

The invention moreover relates to a computer program product, which is stored on a machine-readable medium, or computer data signal, embodied by an electromagnetic wave, with program code for producing control data depending on an actual state, which in particular is determined continuously, of an aerial vehicle and of a defined intended state for automatically controlling the aerial vehicle into the intended state, in particular if the program is carried out in an electronic data processing unit.

BRIEF DESCRIPTION OF THE DRAWINGS

The method according to the invention and the system according to the invention are described in more detail below in a purely exemplary manner on the basis of specific exemplary embodiments which are illustrated schematically in the drawings, wherein further advantages of the invention are also mentioned. In detail.

DETAILED DESCRIPTION

Figure 1A:
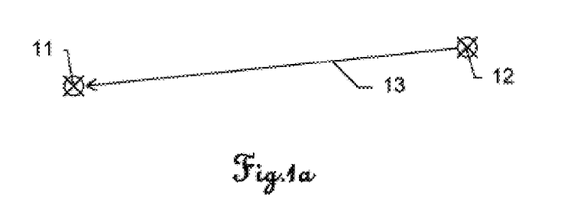
FIGS. 1a-c show a positioning movement, according to the invention, of the aerial vehicle from an actual state to an intended state.

FIG. 1a schematically shows a positioning process according to the invention for an aerial vehicle. Here, the aerial vehicle is in an actual state, which is defined by an actual position 12, an actual velocity and/or an actual alignment, and should assume an intended state. The intended state of the aerial vehicle is predetermined by an intended position 11 and a flight velocity (intended velocity), which should equal zero at the intended position 11. Moreover, an intended alignment of the aerial vehicle can be set within the scope of the intended state, wherein the aerial vehicle can be equipped with a measuring sensor for determining the alignment and hence be able to carry out a defined self-alignment. Depending on the intended state and the actual state, it is now possible to determine a correction 13, i.e. the actual state of the aerial vehicle can be compared to the intended state and a difference for the respective state variable (position, velocity, alignment) can be calculated therefrom. Furthermore, control data or control signals can be derived from these state differences and transmitted to the motors of the rotors for controlling the aerial vehicle. On the basis of the corrections 13, the aerial vehicle can now be controlled with a specific velocity and alignment, proceeding from the actual state, in particular from the actual position 12, in such a way that there is e.g. an iterative approach to the intended state or to the intended position 11. In the process, the actual state of the aerial vehicle is continuously compared to the intended state and a respective correction 13 is derived therefrom. This correction 13 of the actual state of the aerial vehicle can occur until the actual state of the aerial vehicle corresponds to the intended state or the difference comes to rest below a predefined threshold such that a correction 13 no longer needs to be carried out.

Figure 1B:
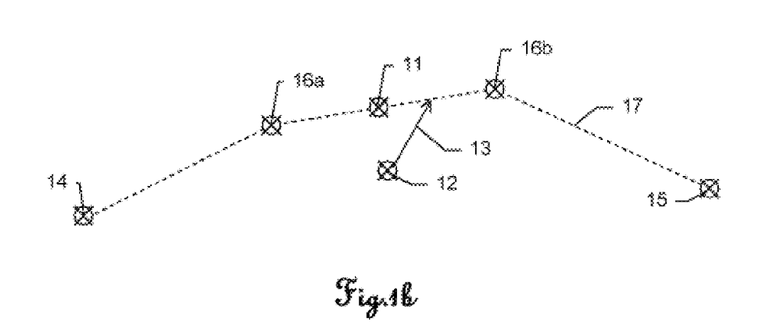

FIG. 1b shows positioning according to the invention of an aerial vehicle on a predetermined trajectory 17. The trajectory 17 or flight route for the aerial vehicle is in this case limited by a start point 14 and an end point 15 and the profile thereof is defined by further waypoints 16a, 16b. The aerial vehicle is in an actual state, which, in turn, can be defined by an actual position 12, an actual velocity and/or an actual alignment of the aerial vehicle. Here, the actual state can be determined by means of an evaluation unit. In this arrangement, the intended state (intended position 11) of the aerial vehicle is determined by the profile of the trajectory 17. Here corrections 13 are also established by comparing the actual state with the intended state, which corrections are converted into control signals for the aerial vehicle and transmitted to the latter. During the calculation of a positional correction 13, the current alignment or the flight direction and the velocity can be taken into account here, wherein the aerial vehicle is not necessarily directed to the trajectory 17 on the shortest distance, but rather is controlled in an optimized direction and with an optimized velocity to the flight route. By way of example, this can avoid strong deceleration and acceleration of the aerial vehicle and an abrupt change in direction. Moreover, an optimized reduction in the flight velocity can be prescribed at e.g. those waypoints 16a, 16b, 16c at which there is a change in direction of the flight path.

Figure 1C:
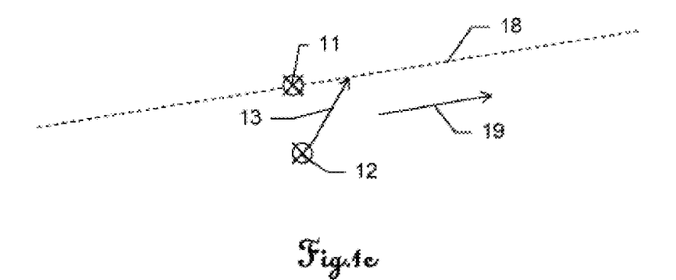

FIG. 1c shows an alignment and positioning, according to the invention, of an aerial vehicle on a predetermined axis 18. It is possible to calculate the corrections 13 taking into account the actual state, inter alia the actual position 12, and control signals transmitted by a user, which control signals can bring about a forward and backward movement of the aerial vehicle along the axis 18. Analogously to the positioning as per FIG. 1b, the movement of the aerial vehicle from the actual position 12 to the intended position 11 can be optimized in such a way that, in particular, the flight velocity or control commands, such as e.g. a movement direction 19, additionally entered by a user are taken into account in the correction movement 13 and, as a result thereof, the flight path is not along the shortest path between actual position 12 and axis 18. In the shown case, the correction movement 13 of the aerial vehicle 20 can be in the direction 19 to the right-hand side due to a control command.

Figure 2:
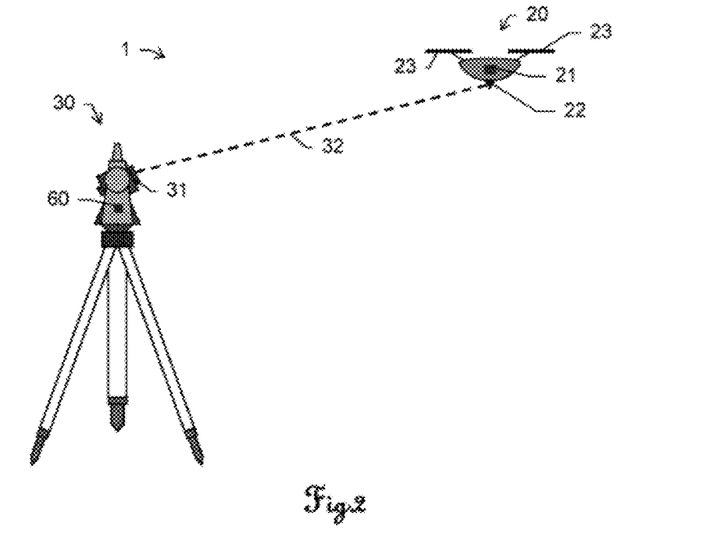
FIG. 2 shows a first embodiment of a measuring system according to the invention, with an unmanned aerial vehicle and a total station.

FIG. 2 shows a measuring system 1 according to the invention, with an unmanned aerial vehicle 20 and a total station 30, which represents a measuring unit.

The actual state of the aerial vehicle 20, in particular the actual position, can in this case be detected by measurements from the total station 30 or a laser scanner (not shown here). The total station 30 is equipped with an emission unit 31, which can be pivoted about two axes, as a result of which an emission direction can be aligned with the aerial vehicle 20. The precise alignment can be detected by angle measurement sensors on the total station 30. Additionally, a distance measuring module, which renders it possible to carry out a measurement of a distance to a reflector 22 on the aerial vehicle 20, is integrated into the emission unit 31. An actual position or actual coordinates of the aerial vehicle 20 can be determined from the measured angles and the distance. In order to determine the actual alignment, there can be on the part of the measuring instrument, e.g. by a camera integrated in the emission unit 31 or by an external camera, the field of view of which can be aligned to the aerial vehicle 20, in particular via a mirror, wherein a marking, e.g. several LEDs or defined patterns, can be observed and detected at a known position on the housing of the aerial vehicle 20. Moreover, measurement data in respect of the actual state can also be detected by a sensor unit 21, which for example has an accelerometer, rate sensor, magnetometer, inclination sensor and/or a velocity sensor.

All measurement data can be transmitted to a control unit 60 e.g. via cable or radio link, which control unit is situated in the total station 30 in this embodiment but can alternatively be arranged in a remote control or in the aerial vehicle 20. An algorithm, e.g. a Kalman filter, can be used to calculate the actual state (position, velocity, alignment) of the aerial vehicle 20 from the measurement data.

In the process, the measurement data can be detected with different measurement frequencies. Thus, the total station 30 can detect e.g. the angles and the distance with a measurement frequency of e.g. 1 Hz, while the accelerometer can determine the accelerations acting thereon with a frequency of e.g. 100 Hz or more. By a suitable combination of the sensors, the position can thus be determined by the Kalman filter with a frequency of e.g. 100 Hz or more and thus have a positive effect on regulating the aerial vehicle. All measurements, e.g. angles and distance and/or accelerations, inclines and/or rates, from the sensor unit can be fed to the Kalman filter, which continuously calculates positional coordinates, a velocity vector and/or an alignment angle as well as possible sensor-specific parameters, e.g. the bias of the accelerometer, of the aerial vehicle with a frequency of e.g. 100 Hz or more.

Corrections can be derived from the actual state and control signals, which, for example, are entered into the system 1 by a user via a remote control, wherein these corrections are transmitted directly or in the form of further control signals to the motors of the aerial vehicle 20 and can bring about a corrected positioning of the aerial vehicle 20.

In this first embodiment shown here, the measurement data for determining the actual state of the aerial vehicle 20 can be detected by the total station 30 and a sensor unit 21. The emission unit 31 of the total station 30 can be aligned continuously to the reflector 22 on the aerial vehicle 20 by an automatic target detection function and, as a result, track the aerial vehicle 20. In the case where the automatic target tracking loses the connection to the target (reflector 22), e.g. due to a visual obstacle, an approximate position can be transmitted by radio link to the measuring instrument 30 on the basis of measurements of the sensor unit 21 and/or of a GNSS module on the aerial vehicle 20. On the basis of this information, the measuring instrument 30 can find the target again, reestablish the connection and once again carry out automatic target tracking. Furthermore, if the connection is lost thus, the aerial vehicle 20 can be detected by a camera and e.g. a contour of the aerial vehicle 20 can be derived by image processing and the measuring unit 30 can be newly aligned with the UAV 20 on the basis thereof. The distance measuring module and the angle sensors, which are arranged on the total station 30, can be used to measure the distance to the reflector 22 and the alignment of the emission unit 31 and hence the direction of a beam 32, in particular a measurement beam, emitted by the emission unit 31. The measurement data can then be transmitted on to the control unit 60 in the total station 30.

At the same time, the alignment of the aerial vehicle 20 can be determined by a sensor unit 21. To this end, use can be made of measurements from an accelerometer, a rate sensor, a velocity sensor, an inclination sensor and/or a magnetometer, which can be arranged in the sensor unit 21 onboard of the aerial vehicle 20. The measurement data determined thereby can be transmitted to the control unit 60 via e.g. radio link.

The actual state of the aerial vehicle 20 can be calculated in the control unit 60 from the measurement data established by the total station 30 and by the sensor unit 21, and it can be compared to the predetermined intended state. From this, it is possible, in turn, to derive the corrections which can be transmitted to the aerial vehicle 20 by radio link and, there, can be transmitted as control signals on to the rotors 23 for positioning and alignment purposes.

Figure 3:
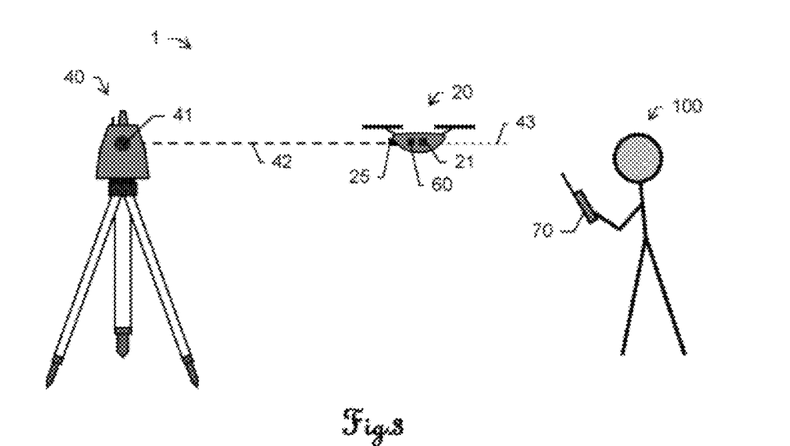
FIG. 3 shows a second embodiment of a measuring system according to the invention, with an unmanned aerial vehicle and a laser scanner.

FIG. 3 shows a second embodiment of a measuring system 1 according to the invention, with an unmanned aerial vehicle 20 and a laser scanner 40 as measuring unit.

In this case, a movement axis 43 is prescribed on the part of the laser scanner 40 for the aerial vehicle 20 by emitting an optical beam 42. To this end, the beam 42, in particular a laser beam, is, using a rotatable mirror 41 in an emission unit, emitted in a direction in which the aerial vehicle 20 should be moved. When the aerial vehicle 20 is coupled to the laser beam 42, a lateral positional deviation and an angular deviation of the aerial vehicle 20 from the predetermined axis 43 is determined by a beam detection unit 25. Additional measurement data, such as e.g. the inclinations of the aerial vehicle 20, can, in turn, be detected by the sensor unit 21. By way of example, the aerial vehicle 20 can be coupled to the beam 42 by virtue of a user 100 moving the aerial vehicle 20 to the laser beam 42 by means of a remote control unit 70 or by virtue of the laser beam 42 being directed to the detection unit 25, the aerial vehicle 20 being coupled on and the beam 42 then being aligned in a defined direction, with the aerial vehicle 20 remaining coupled on and being moved along accordingly with the realignment of the beam 42.

The measurement data to be detected in order to determine the actual state can in this case be detected on the aerial vehicle 20 by means of the beam detection unit 25. By way of example, this beam detection unit 25 can consist of a reception optical unit and an image sensor, wherein the laser beam 42 can be imaged as laser point in the recorded image and a beam offset or an angle of incidence can be detected.

Depending on the design of the reception optical unit, it is possible to determine the lateral positional deviation or the angular deviation of the laser beam 42 from an optical axis of the reception optical unit from the position of the laser point in the image. The angular deviation can be detected by means of a collimator associated with the reception optical unit. A detection unit 25 which can detect both the lateral positional deviation and the angular deviation with two reception optical units is also feasible.

All measurement data can be transmitted to the control unit 60 on the aerial vehicle by a wire connection or by means of a radio link and can be used there to calculate the actual state of the aerial vehicle. Additionally, control data, which can bring about a forward or backward movement of the aerial vehicle along the axis 43, can be transmitted from the user 100 to the control unit 60 via the remote control unit 70. From a comparison of the actual state with the intended state, it is possible to calculate corrections while taking into account the user-defined control data, which corrections can be transmitted to the rotors of the aerial vehicle 20 as control signals and can bring about an alignment and positioning of the aerial vehicle 20 on the laser beam 20, i.e. a correspondence of the predetermined direction of the movement axis 43 with an optical axis of the beam detection unit 25. Moreover, the lateral beam offset and the angular offset can be fed to the Kalman filter, which, in particular, is embodied in the control unit 60.

In this embodiment, it is also possible to realize a semi-autonomous control of the aerial vehicle 20 in such a way that the movement axis 43, along which the aerial vehicle 20 should move, is prescribed to the system 1 as intended state. Using this system 1, which operates by the interaction of laser beam 42, beam detection unit 25 and optionally additional measurement data from the sensor unit 21, the aerial vehicle 20 can automatically be kept on the movement axis 43. The forward and backward movement along the axis 43, i.e. a movement of the aerial vehicle 20 with one degree of freedom, can therefore be brought about in a simple manner by the user 100 by means of the remote control unit 70.

If the aerial vehicle 20 should moreover be positioned on the predetermined movement axis 43 at a predetermined distance from the laser scanner 40, the actual distance can be measured by a distance measurement using the laser scanner 40. By comparing this actual distance with the predetermined intended distance, it is once again possible to calculate corrections, which are transmitted to the aerial vehicle 20 as control signals for actuating the rotors 23 and can bring about a positioning of the aerial vehicle 20 at the predetermined intended distance. Since the alignment of the beam 42 emitted by the laser scanner 40 and the distance to the aerial vehicle 20 in this beam direction are known, the position of the aerial vehicle 20 can moreover be determined exactly or the coordinates can be derived in respect of a relative coordinate system of the laser scanner 40.

Figure 4A:
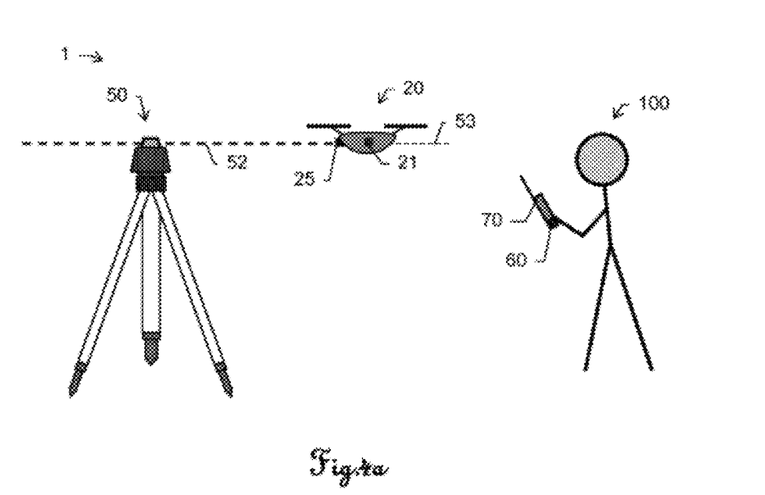
FIGS. 4a-b respectively show a third embodiment of a measuring system according to the invention, with an unmanned aerial vehicle and a rotation laser.
Figure 4B:
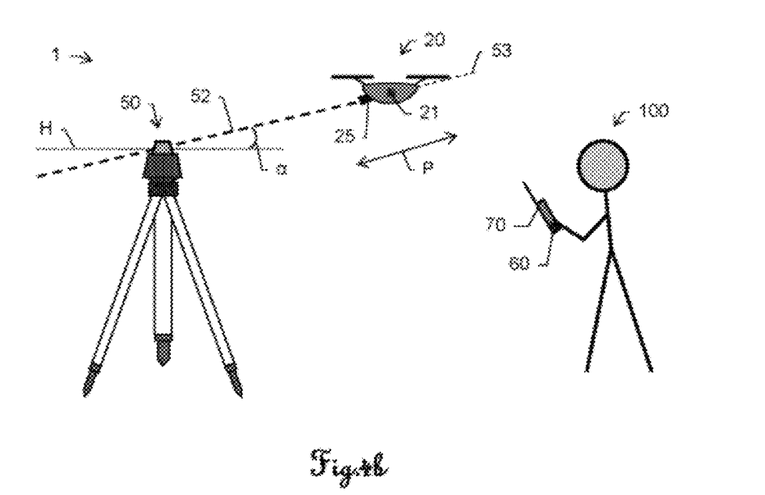

FIGS. 4*a* and 4*b* respectively show a third embodiment of a measuring system 1 according to the invention, with an unmanned aerial vehicle 20 and a rotation laser 50, and are therefore described together here. In these embodiments, the rotation laser 50 or a rotating emission of a laser beam 52 from the rotation laser 50 can predetermined a guide plane 53 or an intended movement plane in the horizontal (FIG. 4*a*) or at a predetermined angle α to the horizontal H (FIG. 4*b*) in order to keep and to move the aerial vehicle 20 at a constant altitude or to move it in a defined direction. In principle, such a plane can also be defined by a rotating sighting unit of a total station while emitting a measurement beam.

When using a total station, it is possible, depending on the horizontal position of the aerial vehicle 20, to rotate the sighting unit about the vertical axis and thereby align the emitted measurement beam with the aerial vehicle 20. In the case of the rotation laser 50, the plane 53 can be spanned independently of the position of the aerial vehicle 20 by a laser beam 52 which is rotating quickly about an axis.

Using the beam detection unit 25 it is possible to detect the deviation of the aerial vehicle 20 from a position defined by the plane, e.g. in altitude. The incline and alignment of the aerial vehicle 20 can in turn be determined by the sensor unit 21 on board of the aerial vehicle 20. These measurement data are transmitted via radio link to the control unit 60, which is integrated in the remote control unit 70, of the user 100. There it is possible to calculate the actual state of the aerial vehicle 20 in this fashion. From a comparison between the actual state and the intended state, which in this case for example corresponds to a positioning and alignment of the aerial vehicle 20 on the defined laser plane 53, corrections are calculated taking into account possible additional control data produced by the user 100, which corrections are transmitted as control signals to the aerial vehicle 20 in order to actuate the rotors 23 and are able to bring about a positioning of the aerial vehicle 20 in the predetermined intended state, i.e. a positioning and/or movement of the aerial vehicle 20 in the guide plane 53.

Hence, there can be an automatic continuous change in the altitude of the aerial vehicle 20 in such a way that it is positioned on the predetermined horizontal plane 53 (FIG. 4*a*). The change in the position of the aerial vehicle 20 in the plane 53 can furthermore be brought about by the user 100 by means of the remote control 70, which can be realized as Smartphone or tablet PC. The user 100 can therefore move the aerial vehicle 20 in the plane 53, i.e. with two remaining degrees of freedom.

In the case of a non-horizontal alignment of the plane 53 in accordance with FIG. 4*b*, the beam detection unit 25 can be arranged at a corresponding angle on the aerial vehicle 20 or the alignment of the detection unit 25 can be adapted by a pivot device to the angle α of the plane 53. In the case of such an arrangement, the user 100 can freely move the aerial vehicle 20 with two degrees of freedom on this angled plane 53—indicated by the arrow P.

Figure 5A:
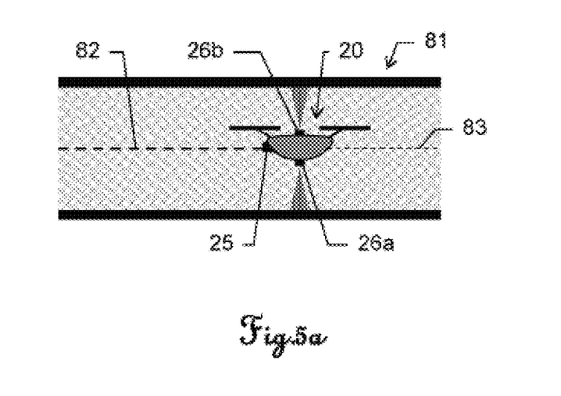
FIGS. 5a-c show three embodiments for an aerial vehicle controlled by a measuring system according to the invention.
Figure 5B:
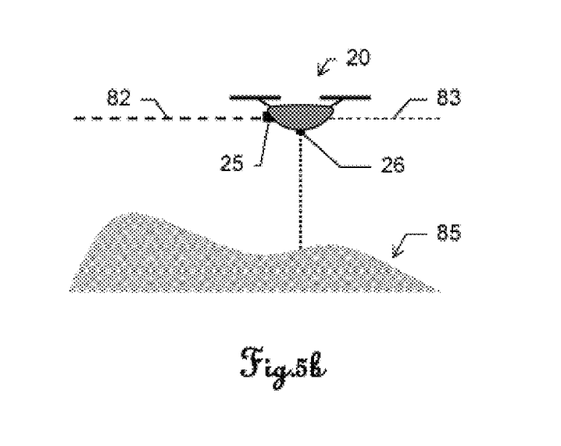
Figure 5E:
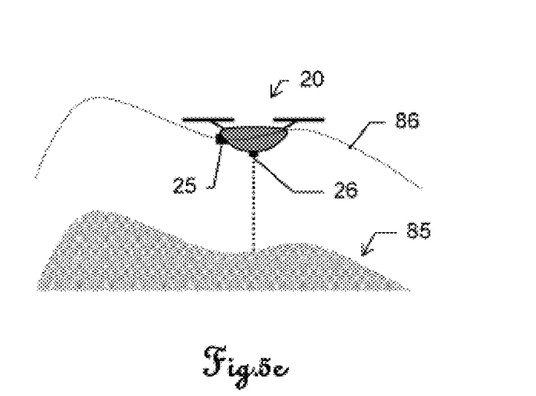

FIGS. 5*a*, 5*b* and 5*c* show three embodiments for an aerial vehicle 20 controlled by a measuring system according to the invention.

FIG. 5*a* shows an aerial vehicle 20, which has a beam detection unit 23 which is aligned to a laser beam 82. With this, the aerial vehicle 20 can be guided along a movement axis 83. The laser beam 82 is aligned coaxially to the axis of a pipe 81, which therefore corresponds to the movement axis 83. With this arrangement, the aerial vehicle 20 can be moved, for example in a narrow pipe 81, by means of the continuous guide along the beam 82 provided by the beam detection unit 23 in such a way that the distance to the pipe wall can be kept constant and a collision with the pipe wall can be avoided. Moreover, the aerial vehicle 20 can comprise distance measuring sensors 26*a*, 26*b*, e.g. scanners, which continuously detect distances to the pipe wall and provide measurement data. This data can additionally be used to control the aerial vehicle 20 and can be taken into account when calculating correction values for changing the aerial vehicle state. A user can therefore very easily move the aerial vehicle 20 backward and forward and position said aerial vehicle manually in the pipe 81, in particular by means of a remote control.

FIG. 5*b* shows a further application for an aerial vehicle 20 which is controlled in a guided manner according to the invention. Here, terrain 85 should be measured. To this end, a laser beam 82 can once again be aligned in the direction of a horizontal axis 83 and the aerial vehicle 20 can be moved along this beam 82 by means of a beam reception unit 25, in particular on the basis of the beam offset and/or the angle of incidence. Using an additional sensor 26, which can be aligned downward in the vertical direction, it is possible to measure the distance to the terrain surface continuously while flying over the terrain 85. From this, a distance can be derived in each case between the axis 83 and the terrain and, by linking these distance values with the respective actual position of the aerial vehicle 20, it is possible to establish a terrain profile or terrain section.

FIG. 5*c* shows a further application for an aerial vehicle 20 which is controlled according to the invention. The aerial vehicle 20 is in this case guided in turn in a vertical plane (not shown), defined by a measuring unit, by means of the beam reception unit 25. Using the distance measuring sensor 26, a distance to a surface of an object 85 is measured during the movement of the aerial vehicle 20 and used for determining a flight route 86 for the aerial vehicle 20. As a result of this continuous measurement, it is possible to maintain a constant distance to the object 85 when the aerial vehicle 20 is moved and hence render it possible to avoid a collision with the object.

It is understood that these depicted figures only depict possible exemplary embodiments in a schematic manner. According to the invention, the various approaches can likewise be combined with one another and with systems and methods for controlling aerial vehicles and with measuring instruments from the prior art.

What is claimed is:

1. A geodetic measuring system comprising:
   a stationary, ground-based geodetic measuring instrument embodied as a total station, a theodolite, or an industrial laser tracker, comprising:
   a base;
   a support rotatable by motor relative to the base about a vertical axis;
   a beam source for emitting a substantially collimated optical beam;
   a sighting unit pivotable by motor relative to the support about a horizontal axis;
   angle measurement sensors for determining the alignment of the support with respect to the base, and the sighting unit with respect to the support; and
   a distance meter using the optical beam;
   wherein the support and the sighting unit are configured for aligning an emission direction of the optical beam;
   a helicopter-like self-propelled, unmanned aerial vehicle movable in a controlled fashion and positionable at a substantially fixed position, comprising:
   an optical module embodied as a reflector for reflecting the optical beam, wherein a distance from the measuring instrument to the optical module can be determined by the distance meter, and an actual position of the aerial vehicle can be continuously derived from the distance and the emission direction of the beam;
   a sensor unit having an accelerometer configured to detect inertia values, and a magnetometer configured to detect geographic alignment;
   an evaluation unit for determining an actual state of the aerial vehicle in a coordinate system from an interaction of the optical beam with the optical module and the sensor unit, wherein the actual state is defined by the actual position and the geographic alignment, and optionally also a change in position; and
   a control unit configured in such a way that, on the basis of an algorithm depending on the actual state and a defined intended state, control data for controlling the aerial vehicle is produced, by which the aerial vehicle is brought into the intended state.

2. The geodetic measuring system as claimed in claim 1, wherein the control data is produced and the aerial vehicle is brought into a defined tolerance range about the intended state, in an automatically controlled fashion by means of the control data.

3. The geodetic measuring system as claimed in claim 1, wherein the control unit is configured in such a way that, on the basis of an algorithm depending on the actual state, is determined continuously.

4. The geodetic measuring system as claimed in claim 1, wherein the geodetic measuring instrument comprises a ranging functionality.

5. The geodetic measuring system as claimed in claim 1, wherein:
when determining the actual state, it is possible to take account of at least one of:
an actual position,
an actual alignment and
an actual velocity of the aerial vehicle
when defining the intended state, it is possible to take account of at least one of:
an intended position,
an intended alignment and
an intended velocity.

6. The geodetic measuring system as claimed in claim 5, wherein the aerial vehicle has at least one of:
an inclination sensor,
a rate sensor, and
a velocity sensor,
for determining at least one of:
the actual alignment, and
the actual velocity,
of the aerial vehicle in the coordinate system.

7. The geodetic measuring system as claimed in claim 5, wherein: the aerial vehicle has a marking specifying the actual alignment in at least one of:
a defined pattern,
a pseudo-random pattern,
a barcode, and
a light-emitting diode, and
the measuring system has a RIM camera for taking an image of the aerial vehicle, wherein at least one of:
a contour, and
pixel-dependent distance data,
in respect of the aerial vehicle is derived from the image and the actual alignment and the distance in the coordinate system is determined therefrom.

8. The geodetic measuring system as claimed in claim 5, wherein: the aerial vehicle has a marking specifying the actual alignment in a defined pattern, pseudo-random pattern, a barcode and a light-emitting diode, and
the measuring system has a camera for detecting the marking and for determining the actual alignment of the aerial vehicle in the coordinate system from the position and arrangement of the marking.

9. The geodetic measuring system as claimed in claim 1, wherein the optical module is embodied by a beam detection unit and the optical beam is received by the beam detection unit, wherein a beam offset from a zero position and an angle of incidence of the beam is determined continuously by means of the beam detection unit for at least partly determining the actual state, and the control unit is configured in such a way that the aerial vehicle is positioned and aligned, depending on the beam offset and/or the angle of incidence of the beam.

10. The geodetic measuring system as claimed in claim 9, wherein the aerial vehicle is coupled to the beam by the beam detection unit and is guided along the beam and by a change in the emission direction of the beam.

11. The geodetic measuring system as claimed in claim 10, wherein a horizontal laser plane is defined by a rotation of the beam and the aerial vehicle is, by means of the beam detection unit in a defined fashion relative to guide plane or parallel to the guide plane, at least one of:
positioned, and
guided.

12. The geodetic measuring system as claimed in claim 11, wherein the beam detection unit is pivoted on the aerial vehicle in such a defined fashion that the beam is received.

13. The geodetic measuring system as claimed in claim 1, wherein the control unit is configured in such a way that the aerial vehicle is moved depending on the actual state and a specific flight route, wherein the flight route is determined by at least one of:
a start point and an end point and by a number of waypoints automatically, and
a defined position of a flight axis.

14. The geodetic measuring system as claimed in claim 13, wherein a movement of the aerial vehicle is optimized taking into account the actual state.

15. The geodetic measuring system as claimed in claim 14, wherein information relating to at least one of:
the actual state,
the actual position,
the actual alignment,
the actual velocity,
the angle of incidence,
the beam offset, and
the distance to the measuring instrument,
is fed to a Kalman filter and the movement of the aerial vehicle is controlled taking into account parameters calculated by the Kalman filter.

16. The geodetic measuring system as claimed in claim 1, wherein a position and alignment of the measuring instrument is predetermined in a global coordinate system, wherein at least one of:
the position is predetermined by a known setup point of the measuring instrument, and
the position and alignment is determined by calibration on the basis of known target points.

17. The geodetic measuring system as claimed in claim 16, wherein the coordinate system is referenced with the global coordinate system such that the actual state of the aerial vehicle is determined in the global coordinate system; and one of:
for producing the control data, actual state information, intended state information and the distance between the measuring instrument and the aerial vehicle, and
the control data,
is transmitted between the measuring instrument and the aerial vehicle,
wherein the state information is transmitted by one of:
radio link,
a wired fashion, and
being modulated onto the beam; and
the measuring system has a remote control unit for controlling the aerial vehicle, wherein one of:
the state information, and
the control data,
is transmitted between the remote control unit and the measuring instrument and the aerial vehicle by one of radio link and a cable.

18. The geodetic measuring system as claimed in claim 16, wherein:
the measuring system has a remote control unit for controlling the aerial vehicle, wherein the state information and the control data is transmitted between the remote control unit and the measuring instrument and the aerial vehicle by means of radio link or via a cable.

19. A method for controlling a self-propelled, unmanned, controllable aerial vehicle as claimed in claim 1, wherein:
the geodetic measuring instrument is stationary, separate from the aerial vehicle and a total station, theodolite, laser tracker or laser scanner and is used to bring about an emission of the substantially collimated optical beam in an emission direction;

the optical beam interacts with the aerial vehicle in such a way that the former is reflected or received at the aerial vehicle;

an actual state of the aerial vehicle in a coordinate system is determined from the interaction, which actual state is determined by at least one of:
- a position,
- an alignment, and
- a change in position; and control data are produced depending on the actual state, which is determined continuously, and a defined intended state and the aerial vehicle is brought into a defined tolerance range about the intended state, in an automatically controlled fashion by means of the control data, wherein a distance from the measuring instrument to the aerial vehicle is determined by means of reflecting the beam at the aerial vehicle by the reflector and receiving at the measuring instrument and the actual position of the aerial vehicle is derived from the distance and the emission direction, the accelerometer detects inertia values and the magnetometer detects geographic alignment, wherein the sensor unit on the aerial vehicle determines alignment and velocity of the aerial vehicle in the coordinate system.

20. The method as claimed in claim 19, wherein at least one of:
- an actual position,
- an actual alignment, and
- an actual velocity of the aerial vehicle,
is taken into account when determining the actual state; and
wherein at least one of an intended position, an intended alignment and an intended velocity is taken into account when defining the intended state.

21. The method as claimed in claim 19, wherein at least one of:
- a beam offset from a zero position, and
- an angle of incidence of the beam,
is determined continuously when receiving the beam at the aerial vehicle for determining the actual state; and
the aerial vehicle is positioned and aligned, depending on at least one of:
- the beam offset and
- the angle of incidence of the beam.

22. The method as claimed in claim 21, wherein the aerial vehicle is coupled to the beam and guided along the beam and by a change in the emission direction of the beam.

23. The method as claimed in claim 22, wherein a horizontal laser plane is defined by rotating the beam and the aerial vehicle is positioned and guided in a defined fashion relative to the guide plane or parallel to the guide plane.

24. The method as claimed in claim 19, wherein:
the actual alignment of the aerial vehicle is determined in the coordinate system in the pitch, roll and yaw directions, wherein determination takes place by means of an by means of at least one of:
- an inclination sensor,
- a magnetometer,
- an accelerometer,
- a rate sensor, and
- a velocity sensor
associated with the aerial vehicle; and the actual alignment in the coordinate system is determined by means of an interaction of:
- a marking, which is associated with the aerial vehicle and which specifies the actual alignment of a defined pattern of at least one of:
  - a pseudo-random pattern,
  - a barcode, and
  - a light-emitting diode; and
- a detection of the marking by means of a camera for determining the actual alignment from a position and arrangement of the marking.

25. The method as claimed in claim 19, wherein the aerial vehicle is moved dependent on the actual state and a specific flight route, wherein the flight route is determined automatically by a start point and an end point and by a number of waypoints and by a defined position of a flight axis.

26. The method as claimed in claim 25, wherein a movement of the aerial vehicle is optimized taking into account the actual state.

27. The method as claimed in claim 26, wherein information in respect of at least one of:
- the actual position,
- the actual alignment,
- the actual velocity,
- the angle of incidence,
- the beam offset and
- the distance to the measuring instrument,
is fed to a Kalman filter and the movement of the aerial vehicle is controlled taking into account parameters calculated by the Kalman filter.

28. The method as claimed in claim 19, wherein:
an object distance from the aerial vehicle to an object is measured continuously;
the object distance is taken into account when controlling the aerial vehicle; and/or
the aerial vehicle is controlled in such a way that the aerial vehicle is guided constantly at a specific intended distance from the object depending on at least one of:
- the measurement of the object distance, and
- a position and alignment of the measuring instrument is predetermined in a global coordinate system,
wherein the position is predetermined by a known setup point of the measuring instrument and the position and alignment is determined by calibration on the basis of known target points.

29. The method as claimed in claim 28, wherein the coordinate system is referenced with the global coordinate system such that the actual state of the aerial vehicle is determined in the global coordinate system.

30. A geodetic measuring instrument for a system as claimed in claim 1, wherein the measuring instrument is embodied in such a way that control data for controlling a self-propelled, unmanned, controllable aerial vehicle is generated and transmitted to the aerial vehicle.

31. A non-transitory tangible computer program product, which is stored on a machine-readable medium, with program code for producing control data depending on an actual state of an aerial vehicle and of a defined intended state for automatically controlling the aerial vehicle into the intended state as claimed in claim 1.

32. A geodetic measuring system comprising:
a stationary, ground-based geodetic measuring instrument embodied as a total station, a theodolite, or an industrial laser tracker, comprising:
- a base;
- a support rotatable by motor relative to the base about a vertical axis;

a beam source for emitting a substantially collimated optical beam;
a sighting unit pivotable by motor relative to the support about a horizontal axis; and
angle measurement sensors for determining the alignment of the support with respect to the base, and the sighting unit with respect to the support; and
a distance meter using the optical beam;
wherein the support and the sighting unit are configured for aligning an emission direction of the optical beam;
a helicopter-like self-propelled, unmanned aerial vehicle movable in a controlled fashion and positionable at a substantially fixed position; and
an evaluation unit, wherein the evaluation unit is configured in such a way that it is possible to determine an actual state of the aerial vehicle in a coordinate system, determined by a position, an alignment and a change in position, from an interaction of the optical beam with the optical module; and
wherein the measuring system comprises a control unit for controlling the aerial vehicle, wherein the control unit is configured in such a way that, on the basis of an algorithm depending on the actual state and a defined intended state, control data can be produced and the aerial vehicle can be brought into the intended state,
wherein the optical module is embodied by a reflector which specifies the actual position of the aerial vehicle and the beam can be reflected by means of the reflector, wherein a distance from the measuring instrument to the aerial vehicle is determined by the reflection of the beam and reception at the measuring instrument and the actual position of the aerial vehicle is derived continuously from the distance and the emission direction of the beam,
wherein the aerial vehicle has a sensor for continuously measuring an object distance to an object, wherein:
the object distance is taken into account when controlling the aerial vehicle; and/or
the aerial vehicle is controlled in such a way that the aerial vehicle is guided constantly at a specific intended distance from the object depending on the measurement of the object distance.

33. The geodetic measuring system as claimed in claim 32, wherein: the aerial vehicle has a marking specifying the actual alignment in a defined pattern, pseudo-random pattern, a barcode and a light-emitting diode, and
the measuring system has a camera for detecting the marking and for determining the actual alignment of the aerial vehicle in the coordinate system from the position and arrangement of the marking.

34. A method for controlling a self-propelled, unmanned, controllable aerial vehicle as claimed in claim 32, wherein:
the geodetic measuring instrument is stationary, separate from the aerial vehicle and a total station, theodolite, laser tracker or laser scanner and is used to bring about an emission of the substantially collimated optical beam in an emission direction;
the optical beam interacts with the aerial vehicle in such a way that the former is reflected or received at the aerial vehicle;
an actual state of the aerial vehicle in a coordinate system is determined from the interaction, which actual state is determined by a position, an alignment and a change in position; and
control data are produced depending on the actual state, which is determined continuously, and a defined intended state and the aerial vehicle is brought into a defined tolerance range about the intended state, in an automatically controlled fashion by means of the control data,
wherein a distance from the measuring instrument to the aerial vehicle is determined by means of reflecting the beam at the aerial vehicle by the reflector and receiving at the measuring instrument and the actual position of the aerial vehicle is derived from the distance and the emission direction, wherein:
the actual alignment in the coordinate system is determined by means of an interaction of:
a marking, which is associated with the aerial vehicle and which specifies the actual alignment of a defined pattern of a pseudo-random pattern, of a barcode and of a light-emitting diode; and
a detection by means of a camera, of the marking for determining the actual alignment from a position and arrangement of the marking.

35. The method as claimed in claim 34, wherein:
an object distance from the aerial vehicle to an object is measured continuously;
the object distance is taken into account when controlling the aerial vehicle; and/or
the aerial vehicle is controlled in such a way that the aerial vehicle is guided constantly at a specific intended distance from the object depending on the measurement of the object distance and a position and alignment of the measuring instrument is predetermined in a global coordinate system, wherein the position is predetermined by a known setup point of the measuring instrument and the position and alignment is determined by calibration on the basis of known target points.

* * * * *